United States Patent [19]

Brown

[11] 4,408,981
[45] Oct. 11, 1983

[54] SUPPORT FOR AN INTERMEDIATE PLATEN OF A STACK MOLD

[75] Inventor: Paul Brown, Orangeville, Canada

[73] Assignee: Husky Injection Molding Systems Inc., Bolton, Canada

[21] Appl. No.: 389,972

[22] Filed: Jun. 18, 1982

[51] Int. Cl.³ .............................................. B29C 3/02
[52] U.S. Cl. .................................... 425/589; 425/338
[58] Field of Search ........................ 425/338, 589, 588

[56] References Cited

U.S. PATENT DOCUMENTS 3,484,901 12/1969 Anderson ........................ 425/589 X
3,712,779 1/1973 Luginbuhl ........................... 425/589
4,154,566 5/1979 Wand ............................... 425/338 X
4,285,384 8/1981 Wunder .......................... 425/589 X
4,315,728 2/1982 Hehl ................................... 425/589

Primary Examiner—Thomas P. Pavelko
Attorney, Agent, or Firm—Karl F. Ross

[57] ABSTRACT

An intermediate platen carrying two inner plates of a stack mold, coacting with two outer plates respectively mounted on a stationary and a movable platen of an injection-molding machine which are interconnected by a set of four tie bars, has a pair of forwardly extending and a pair of rearwardly extending outrigger arms terminating in respective shoes which slide on two of the tie bars, preferably the lower ones.

6 Claims, 6 Drawing Figures

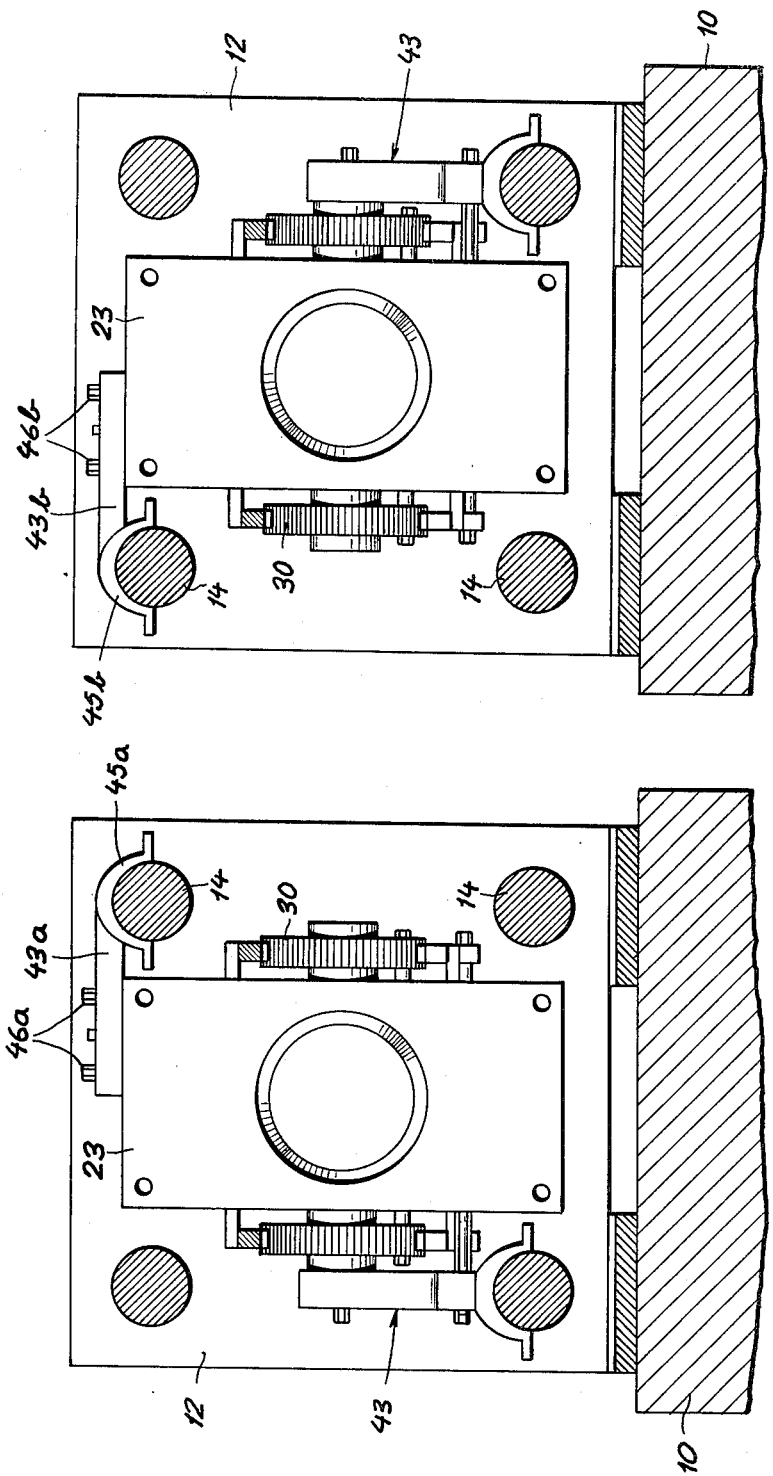

SUPPORT FOR AN INTERMEDIATE PLATEN OF A STACK MOLD

FIELD OF THE INVENTION

My present invention relates to an injection-molding machine wherein a so-called stack mold includes two or more pairs of plates carried on a stationary platen, a movable platen and at least one intermediate platen which is subjected to a correlated displacement with the movable platen during the opening and the closure of the mold.

BACKGROUND OF THE INVENTION

An injection-molding machine including such an intermediate platen has been disclosed, for example, in commonly owned U.S. Pat. No. 4,207,051. This patent shows the intermediate platen slidably traversed by the tie bars interconnecting the two outer platens. Commonly owned U.S. Pat. No. 3,767,352 illustrates a stack mold whose inner plates are floatingly supported by the associated outer plates with the aid of an articulated linkage and without the use of a third platen. The latter arrangement is suitable only with mold plates of relatively low weight. Moreover, as likewise shown in the last-mentioned patent, the required precise alignment of the several plates in the mold-closed position necessitates the use of guide or leader pins on, say, the inner plates receivable in aligned bores of the adjoining outer plates. These guide pins, which must be of fairly large diameter, diminish the space available for mold cavities or cores.

Reference may further be made to commonly owned U.S. Pat. Nos. 3,659,997, 3,723,040 and 3,973,892 showing such inner plates directly supported by the tie bars. This type of mounting is applicable only to mold plates with guide bores conforming in size and location to the tie bars of a given machine. Moreover, the emplacement and removal of the mold plates requires a partial disassembly of the plate-supporting structure, such as a withdrawal of the tie bars from one of the platens, unless the mold plates themselves are split into separable sections.

A possible alternative already proposed is to suspend the inner mold plates on the upper tie bars by means of lateral extensions slidably engaging same. Such a system is relatively simple and quite satisfactory in terms of mold alignment but has only limited stability on account of the large offset of the points of support from the center of the plates; thus, unsymmetrical stresses acting upon these plates during the mold-opening and mold-closing strokes may result in dislocation and possible serious damage to the mold.

It is therefore advantageous to provide each inner pair of mold plates with its own platen in the general manner disclosed in the aforementioned U.S. Pat. No. 4,207,051. Since, however, such an intermediate platen cannot be readily removed from the machine when traversed by the tie bars as shown in that patent, the installation of the associated mold plates on its two surfaces is somewhat inconvenient and must be performed by a skilled operator.

OBJECT OF THE INVENTION

The object of my present invention, therefore, is to provide means in such an injection-molding machine for securely supporting one or more pairs of inner plates of a stack mold with avoidance of the inconveniences and other drawbacks discussed above.

SUMMARY OF THE INVENTION

I realize this object, in accordance with my present invention, by providing an intermediate platen with two pairs of outrigger arms extending in opposite directions generally parallel to the tie bars, each outrigger arm terminating in a respective part-cylindrical shoe which slidably engages one of the tie bars at a location between this intermediate platen and one of the outer platens. Since that intermediate platen cannot approach any of the other platens to a distance less than the combined thickness of the intervening pair of mold plates, the shoes on the oppositely extending outrigger arms can be widely spaced in the direction of mold motion so as to provide a stable four-point support for the intermediate platen.

In principle, any two tie bars on opposite sides of the mold axis can be engaged by the shoes of the two pairs of outrigger arms. In many instances, however, it will be advantageous to choose for this purpose the two lower tie bars, in which case it is also possible to provide additional support for the intermediate platen by fitting the shoes with downward extensions riding on rails of the machine bed that can also be used for slidably supporting the movable outer platen.

My present improvement is, of course, applicable to stack molds with two or more pairs of inner plates carried on respective intermediate platens.

BRIEF DESCRIPTION OF THE DRAWING

The above and other features of my invention will now be described in detail with reference to the accompanying drawing in which:

FIGS. 3 and 4 are cross-sectional views similar to that of FIG. 2, illustrating two modifications;

SPECIFIC DESCRIPTION

Figure 1:
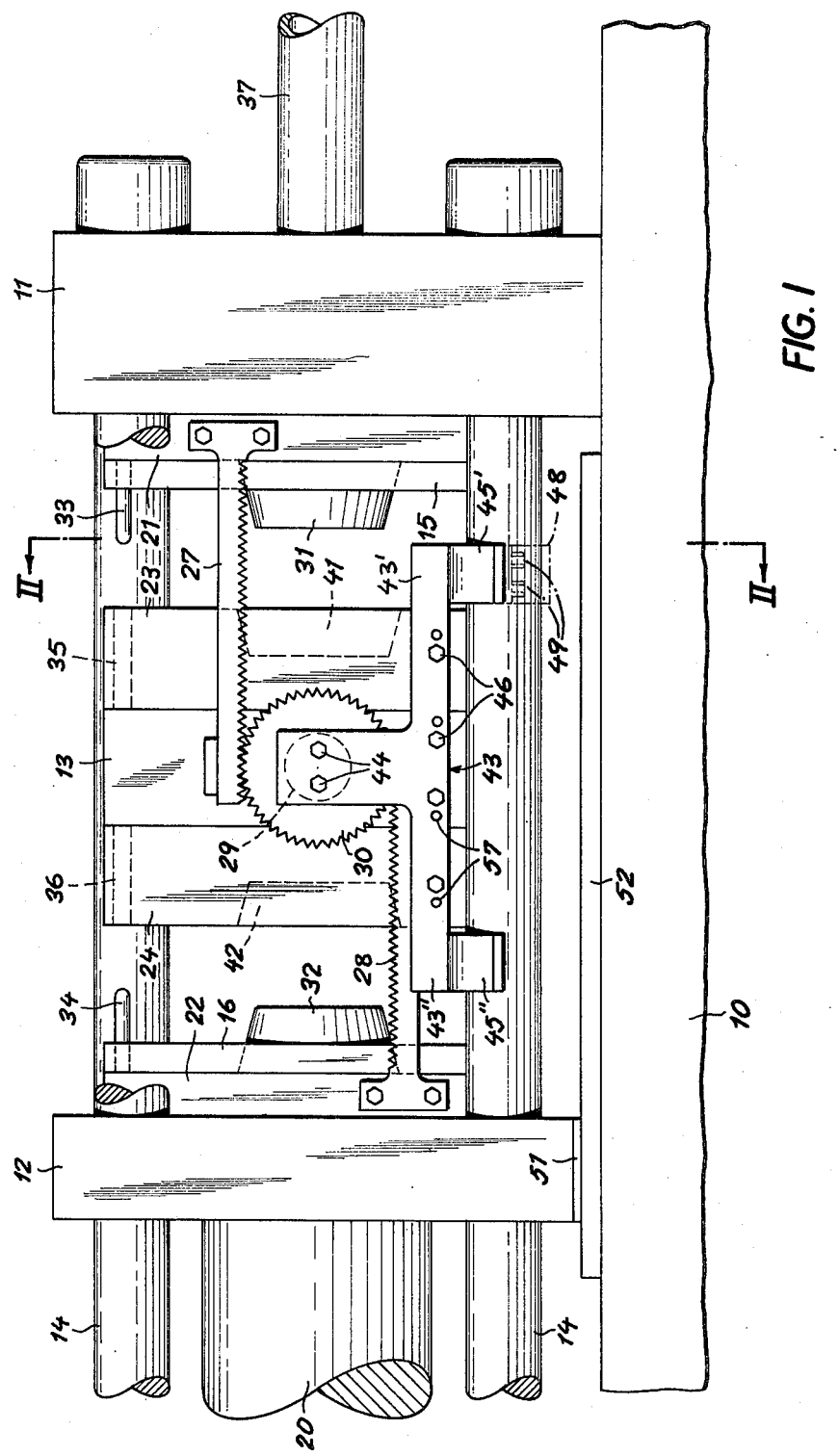
FIG. 1 is a side-elevation view (parts broken away) of a stack mold on an assembly of three platens according to my invention.
Figure 2:
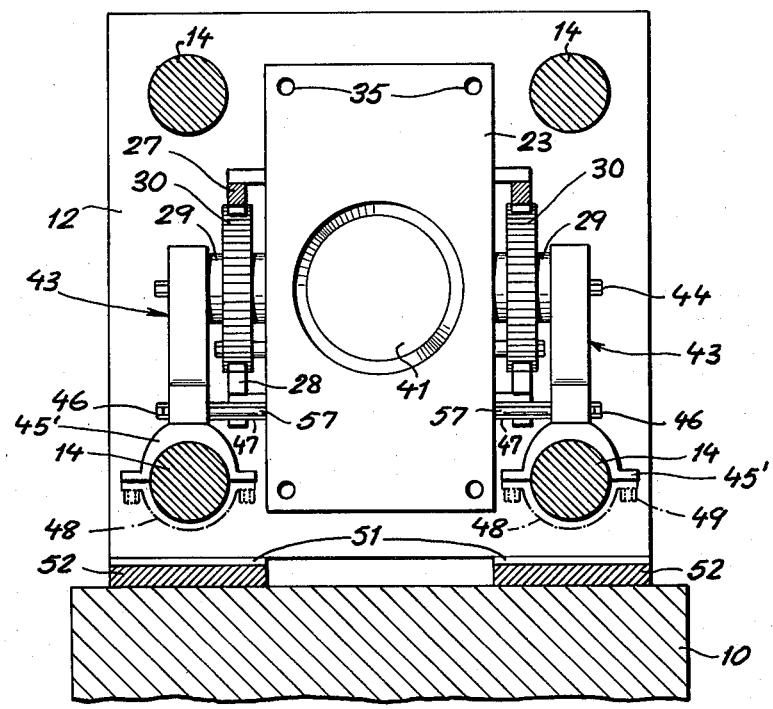
FIG. 2 is a cross-sectional view taken on the line II—II of FIG. 1.

Reference will first be made to FIGS. 1 and 2 showing part of an injection-molding machine generally similar to that of the above-identified U.S. Pat. No. 4,207,051. The machine comprises a bed 10 fixedly supporting a stationary platen 11 from which four tie bars 14 extend to another fixed part of the machine frame not shown. Slidably supported on these tie bars is a movable platen 12 reciprocable by a conventional mold drive including a ram 20. The underside of platen 12 carries pads 51 of low-friction material (e.g. Teflon) which slide on rails 52 above bed 10.

An intermediate platen 13, whose width is less than the horizontal spacing of the tie bars 14, is disposed between the other two platens and supports a pair of inner mold plates 23, 24 respectively coacting with outer mold plates 21 and 22 carried on platens 11 and 12. Thus, mold plate 21 is provided with a core 31 receivable in a cavity 41 of the confronting mold plate 23; similarly, mold plate 22 has a core 32 receivable in a cavity 42 of confronting mold plate 24. Workpieces remaining on cores in the illustrated mold-open position are dislodged by respective stripper plates 15 and 16 under the control of a mechanism (not shown) which, as disclosed in U.S. Pat. No. 4,207,051, may comprise lost-motion linkages connecting these stripper plates with a pair of pinions 30 rotatable on a lateral hub 29 of platen 13. Each pinion 30 is in mesh with two racks 27, 28 respectively extending from mold plates 21 and 22 to insure a correlated displacement of platens 12 and 13 during opening and closure of the mold. Plates 21 and 22 further carry leader or guide pins 33, 34 which are received in aligned bores 35, 36 of plates 23 and 24 when the mold is closed.

In contradistinction to the arrangement of U.S. Pat. No. 4,207,051, where the intermediate platen 13 is slidable like platen 12 on all four tie bars, this intermediate platen is supported in the present instance only by the lower tie bars in a manner facilitating its removal from the machine without major disassembling operations. The platen 13 is flanked for this purpose by a pair of outriggers 43, of inverted-T shape, whose stems are fastened to the respective hubs 29 by screws 44. The bar of each outrigger 43 forms two arms 43', 43" respectively extending toward platens 11 and 12, these arms terminating in shoes 45', 45" with semi-cylindrical surfaces slidably engaging the two lower tie bars. Each T-bar 43', 43" is further secured to platen 13 and to mold plates 23, 24 by several bolts 46 passing through spacing sleeves 47; platen 13 and plates 23, 24 are also provided with lateral alignment pins 57 traversing the two outriggers.

As indicated in phantom lines, the shoes 45', 45" may be provided with respective stirrups 48 which are removably secured thereto by screws 49 and complement these shoes to rings slidably embracing the engaged tie bars.

Since the shoes 45', 45" lie outside the path of the mold plates and of the associated stripper plates, the ends of the outrigger arms 43', 43" may almost touch the outer platens 11 and 12 in the mold-closed position. The wide separation of the shoes of each outrigger imparts a high degree of stability to the support of platen 13, even without the stirrups 48.

Upon closure of the mold, flowable plastic material is introduced into cavity 41 through an injection channel 37 traversing the platen 11. Cavity 42 may be supplied with such plastic material through an extension of channel 37 or through a reciprocable nozzle opening into plate 36 from above, e.g. as disclosed in the aforementioned U.S. Pat. Nos. 3,659,997, 3,723,040 and 3,973,892. Alternatively, a reciprocable manifold of the type disclosed in these patents may have nozzles feeding both inner plates 23 and 24.

As illustrated in FIG. 3, the right-hand outrigger 43 of FIG. 2 may be replaced by an overhead outrigger 43a with shoes 45a resting on the upper right tie bar while being secured by screws 46a to the top of platen 13. A mirror-symmetrical arrangement has been illustrated in FIG. 4 where a similar overhead outrigger 43b fastened to the platen by screws 46b has shoes 45b resting on the upper left tie bar while the lower right tie bar is engaged by the shoes of the right-hand outrigger 43 of FIG. 2. In either of these cases, of course, the shoes may also be fitted with complementary stirrups 48.

Figure 5:
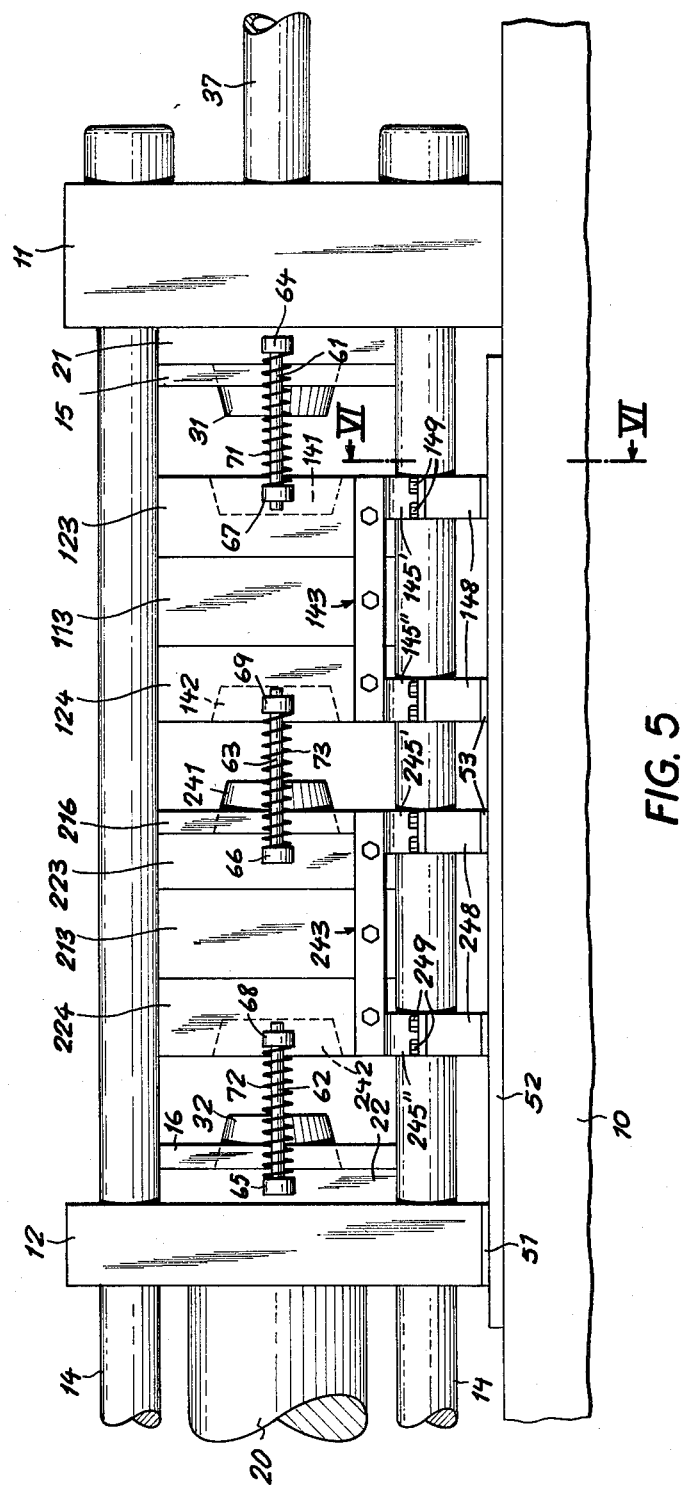
FIG. 5 is a side-elevational view, similar to that of FIG. 1, illustrating a stack mold with two intermediate platens.

In FIG. 5 I have shown a modified stack mold differing from that of FIG. 1 in that the single intermediate platen 13 has been replaced by two such platens 113, 213 carrying respective mold plates 123, 124 and 223, 224. The outer mold plates 21 and 22 are provided, as before, with cores 31, 32 coacting in this instance with respective cavities 141 and 242 of plates 123 and 224. Plate 124 has a cavity 142 designed to receive a core 241 on plate 223. The latter mold plate is provided with a further stripper plate 216.

The two intermediate platens 113 and 213 are equipped with respective outrigger pairs 143, 243 substantially identical with those shown in FIGS. 1 and 2. Shoes 145', 145" of each outrigger 143 and 245', 245" of each outrigger 243 slide on the lower tie bars 14 and are provided with complementary extensions 148, 248 secured thereto by bolts 149, 249. These extensions differ from the stirrups 148 of FIGS. 1 and 2, as best seen in FIG. 6, by having bottom surfaces provided with pads 53 of low-friction material sliding on the rails 52 in the same manner as do the pads 41 supporting the movable platen 12.

Although rack-and-pinion couplings and other linkages could be used in the system of FIG. 5 to correlate the motions of the three moving platens 12, 113 and 213, I have simply shown their plates interconnected by rods 61, 62, 63 fixedly secured to lateral lugs 64, 65, 66 on the male mold portions 21, 22, 223 and slidably guided in lateral lugs 67, 68, 69 on the female mold portions 123, 224 and 124. These rods are surrounded by respective compression springs 71, 72, 73 tending to separate the corresponding mold portions upon the retraction of platen 12 while yielding under the compressive force of the mold drive during the closure stroke. This arrangement is, of course, symmetrically duplicated on both sides of the stack.

Figure 6:
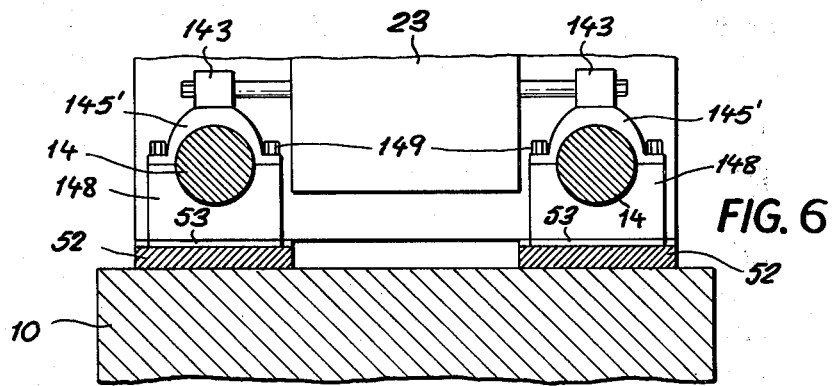
FIG. 6 is a fragmentary cross-sectional view taken on the line VI—VI of FIG. 5.

It will be apparent that the number of intermediate platens can be further increased, if desired, and that the outrigger configurations of FIGS. 2-4 could also be used with the assembly of FIGS. 5 and 6. It may also be pointed out that the outrigger arms carrying the shoes 145' and 245" of FIG. 5 can be further extended toward platens 11 and 12, respectively, without interfering with the operation of the mold.

When it is necessary to remove an intermediate platen from the machine, as for changing the attached mold plates, it is merely necessary to disconnect the two outriggers (or, in the assembly of FIG. 3 or 4, the lower outrigger) and the pinions 30 or equivalent couplings therefrom. If the outriggers engage the two upper tie bars, then only their stirrups (if any) need to be detached aside from these couplings to facilitate the withdrawal of the platen.

I claim:

1. In an injection-molding machine with two upper and two lower horizontal tie bars extending between a stationary outer platen and a fixed support mounted on a machine bed, a movable outer platen slidable along said tie bars, a first mold plate on said stationary platen confronting said movable platen, a second mold plate on said movable platen confronting said stationary platen, and a pair of further mold plates carried on an intermediate platen between said outer platens subjected to correlated displacement with said movable platen between a mold-closed and a mold-open position, the improvement wherein said intermediate platen is provided with two pairs of outrigger arms extending in opposite directions generally parallel to said tie bars, each outrigger arm terminating in a respective part-cylindrical shoe slidably engaging one of said tie bars at a location between said intermediate platen and one of said outer platens.

2. A machine as defined in claim 1 wherein the shoes of each pair of outrigger arms engage a respective lower tie bar.

3. A machine as defined in claim 2, further comprising two rails on said machine bed paralleling said lower tie bars, said shoes having extensions riding on said rails.

4. A machine as defined in claim 3 wherein said rails also support said moving platen.

5. A machine as defined in claim 1, 2, 3 or 4 wherein said shoes are provided with demountable stirrups complementing same to rings embracing the engaged tie bars.

6. A machine as defined in claim 1, 2, 3 or 4 wherein said intermediate platen has a width less than the transverse separation of said tie bars.

* * * * *